(12) United States Patent
Deshpande et al.

(10) Patent No.: US 8,433,374 B2
(45) Date of Patent: Apr. 30, 2013

(54) METHOD AND SYSTEM FOR SELECTING A SLEEP INTERVAL TO IMPROVE BATTERY LIFE

(75) Inventors: Manoj M. Deshpande, San Diego, CA (US); Arnaud Meylan, San Diego, CA (US); Ranjith Jayaram, San Diego, CA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 1225 days.

(21) Appl. No.: 11/550,291

(22) Filed: Oct. 17, 2006

(65) Prior Publication Data

US 2007/0253399 A1 Nov. 1, 2007

Related U.S. Application Data

(60) Provisional application No. 60/795,846, filed on Apr. 27, 2006.

(51) Int. Cl.
*H04M 1/00* (2006.01)

(52) U.S. Cl.
USPC ........ 455/574; 455/572; 455/435.1; 370/311; 370/347

(58) Field of Classification Search .................. 370/311, 370/347; 455/414.2, 466, 522, 552.1, 574, 455/572, 435.1
See application file for complete search history.

(56) References Cited

U.S. PATENT DOCUMENTS

| | | | |
|---|---|---|---|
| 6,067,297 A | 5/2000 | Beach | |
| 6,212,175 B1 * | 4/2001 | Harsch | 370/338 |
| 6,504,819 B2 | 1/2003 | Fowler et al. | |
| 6,622,251 B1 | 9/2003 | Lindskog et al. | |
| 7,010,300 B1 * | 3/2006 | Jones et al. | 455/439 |
| 7,181,190 B2 | 2/2007 | Abhishek et al. | |
| 7,194,288 B2 | 3/2007 | Lee et al. | |
| 7,289,804 B2 | 10/2007 | Kim | |
| 7,369,518 B2 | 5/2008 | Lee | |
| 7,440,781 B2 * | 10/2008 | Beach et al. | 455/574 |
| 7,505,795 B1 | 3/2009 | Lim et al. | |
| 7,515,569 B2 | 4/2009 | Prasad | |
| 7,593,417 B2 | 9/2009 | Wang et al. | |

(Continued)

FOREIGN PATENT DOCUMENTS

| | | |
|---|---|---|
| EP | 1511335 | 3/2005 |
| EP | 1592272 A2 | 11/2005 |

(Continued)

OTHER PUBLICATIONS

International Searching Authority; Partial International Search; PCT/US2007/067670; Oct. 9, 2007.

(Continued)

*Primary Examiner* — Danh C Le
(74) *Attorney, Agent, or Firm* — Abdollah Katbab

(57) ABSTRACT

The disclosure is directed to a mobile communication device that is capable of accessing different types of networks such as a circuit-switched network and a packet-switched network. While communicating over the packet-switched network, the device negotiates a sleep interval that is longer than the ordinary interval available using the packet-switched network. In this manner, the device wakes less frequently and thereby conserves power. A buffering system is included so that data directed towards the device while it is asleep may be buffered for later delivery when the device awakens.

54 Claims, 5 Drawing Sheets

U.S. PATENT DOCUMENTS

| | | |
|---|---|---|
| 7,769,414 B2 | 8/2010 | Yoon et al. |
| 7,916,687 B2 | 3/2011 | Deshpande et al. |
| 2003/0093476 A1 | 5/2003 | Syed |
| 2003/0093530 A1 | 5/2003 | Syed |
| 2003/0112815 A1 | 6/2003 | Lee |
| 2003/0137970 A1 | 7/2003 | Odman |
| 2004/0013256 A1 | 1/2004 | Massoud |
| 2004/0029586 A1 | 2/2004 | Laroia et al. |
| 2004/0072559 A1 | 4/2004 | Kakumaru et al. |
| 2004/0214571 A1 | 10/2004 | Hong |
| 2004/0235336 A1 | 11/2004 | Brekosky et al. |
| 2005/0049013 A1 | 3/2005 | Chang et al. |
| 2005/0085279 A1* | 4/2005 | Aoki ............................ 455/574 |
| 2005/0122936 A1 | 6/2005 | Son et al. |
| 2005/0254444 A1 | 11/2005 | Meier et al. |
| 2005/0288022 A1 | 12/2005 | Ryu et al. |
| 2006/0013256 A1 | 1/2006 | Lee et al. |
| 2006/0126533 A1 | 6/2006 | Wang |
| 2006/0140186 A1 | 6/2006 | LoGalbo et al. |
| 2007/0021155 A1* | 1/2007 | Yu et al. ........................ 455/574 |
| 2007/0127478 A1 | 6/2007 | Jokela et al. |
| 2007/0297438 A1 | 12/2007 | Meylan et al. |

FOREIGN PATENT DOCUMENTS

| | | |
|---|---|---|
| JP | 2002319886 A | 10/2002 |
| JP | 2002368802 A | 12/2002 |
| JP | 2003529954 | 10/2003 |
| JP | 2004128949 A | 4/2004 |
| JP | 2004187002 A | 7/2004 |
| JP | 2004214865 A | 7/2004 |
| JP | 2005080287 A | 3/2005 |
| JP | 2005130436 A | 5/2005 |
| JP | 2007525128 A | 8/2007 |
| JP | 2007533276 | 11/2007 |
| KR | 20050025039 A | 3/2005 |
| TW | 200414707 | 8/2004 |
| WO | WO0060810 | 10/2000 |
| WO | WO0072615 | 11/2000 |
| WO | WO0163842 | 8/2001 |
| WO | WO0169859 A1 | 9/2001 |
| WO | WO0237890 | 5/2002 |
| WO | WO02078258 A2 | 10/2002 |
| WO | WO03025597 | 3/2003 |
| WO | WO2005002137 | 1/2005 |
| WO | WO2005086379 | 9/2005 |
| WO | WO2005125252 A1 | 12/2005 |

OTHER PUBLICATIONS

International Search Report and Written Opinion—PCT/US2007/067670, International Search Authority—European Patent Office—Oct. 12, 2007.

Jing Al et al: "An adaptive coordinated medium access control for wireless sensor networks" Computers and Communications, 2004. Proceedings. ISCC 2004. Ninth International Symposium on Alexandria, Egypt Jun. 28-Jul. 1, 2004, Piscataway, NJ USA, IEEE, vol. 1, Jun. 28, 2004, pp. 214-219 ISBN: 0-7803-8623-X.

European Search Report—EP11163044—Search Authority—Munich—Sep. 1, 2011.

Taiwan Search Report—TW096115133—TIPO—Apr. 19, 2011.

* cited by examiner

METHOD AND SYSTEM FOR SELECTING A SLEEP INTERVAL TO IMPROVE BATTERY LIFE

CLAIM OF PRIORITY UNDER 35 U.S.C. §119

The present Application for Patent claims priority to Provisional Application No. 60/795,846 entitled "STANDBY POWER MANAGEMENT" filed Apr. 27, 2006, and assigned to the assignee hereof and hereby expressly incorporated by reference herein.

BACKGROUND

1. Field

The present disclosure relates generally to telecommunications, and more particularly, to systems and methods to support a mobile communications device capable of communicating via different types of communication networks.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications. Other access technologies include EV-DO and High-Speed Downlink Packet Access (HSDPA).

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between wide area circuit switched cellular networks, wide area packet switched cellular networks and wireless local area networks (LAN). Wireless LANs generally provide telephony and data services over relatively small geographic regions using a standard protocol, such as IEEE 802.11, or the like. The existence of wireless LANs provides a unique opportunity to increase user capacity in a wide area cellular network by extending cellular communications to the unlicensed spectrum using the infrastructure of the wireless LAN.

Recently, various techniques have been employed to enable mobile devices to communicate with different wireless networks such as packet-switched networks and circuit-switched networks. Accordingly, there are now instances in which a session initiated by a mobile device over a circuit-switched network may be handed-off to a packet-switched network. In either case, one important aspect of such communication devices relates to power management and energy efficiency. There remains a need to improve the stand-by capability of such devices by managing the wake and sleep intervals in such a way that does not adversely impact user satisfaction.

SUMMARY

One aspect of a mobile communications device relates to a method for selecting a sleep interval in a mobile communications device capable of communicating over multiple access networks. In accordance with this method, the mobile device negotiates a first sleep interval period with an access point. However, the mobile device then changes the first sleep interval period to a second sleep interval period based on a negotiation with one or more entities other than the access point, wherein the second sleep interval period is longer than the first sleep interval period.

It is understood that other aspects of the present disclosure will become readily apparent to those skilled in the art from the following detailed description, wherein it is shown and described only various aspects of the disclosure by way of illustration. As will be realized, the disclosure is capable of other and different aspects and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various aspects of the disclosure and is not intended to represent the only aspects in which the disclosure may be practiced. The detailed description includes specific details for the purpose of providing a thorough understanding of the disclosure. However, it will be apparent to those skilled in the art that the disclosure may be practiced without these specific details. In some instances, well known structures and components are shown in block diagram form in order to avoid obscuring the concepts of the disclosure.

In the following detailed description, various techniques will be described in connection with the mobile user using variety of applications accessing numerous access networks.

A number of these techniques will be described in the context of a mobile communications device traveling through a circuit switched cellular network with one or more packet switched cellular network and/or wireless LANs dispersed throughout the cellular coverage region. The mobile communications device may be any suitable device capable of wireless telephony or data communications, such as a cellular phone designed for operation in a CDMA2000 1x network. The mobile communications device may be capable of employing any suitable protocol for accessing a wireless LAN, including, by way of example, IEEE 802.11. While these techniques may be described in the context of a cellular phone capable of communicating with an IEEE 802.11 network, those skilled in the art will readily appreciate that these techniques can be extended to other mobile communication devices capable of accessing multiple networks. For instance, these techniques may be applied to a mobile communications device capable of switching within or between a CDMA2000 network and a GSM/UMTS network. Accordingly, any reference to a cellular phone capable of communicating with an IEEE 802.11 network, or any other specific aspect, is intended only to illustrate various aspects of the present disclosure, with the understanding that these aspects have a wide range of applications.

Figure 1A:
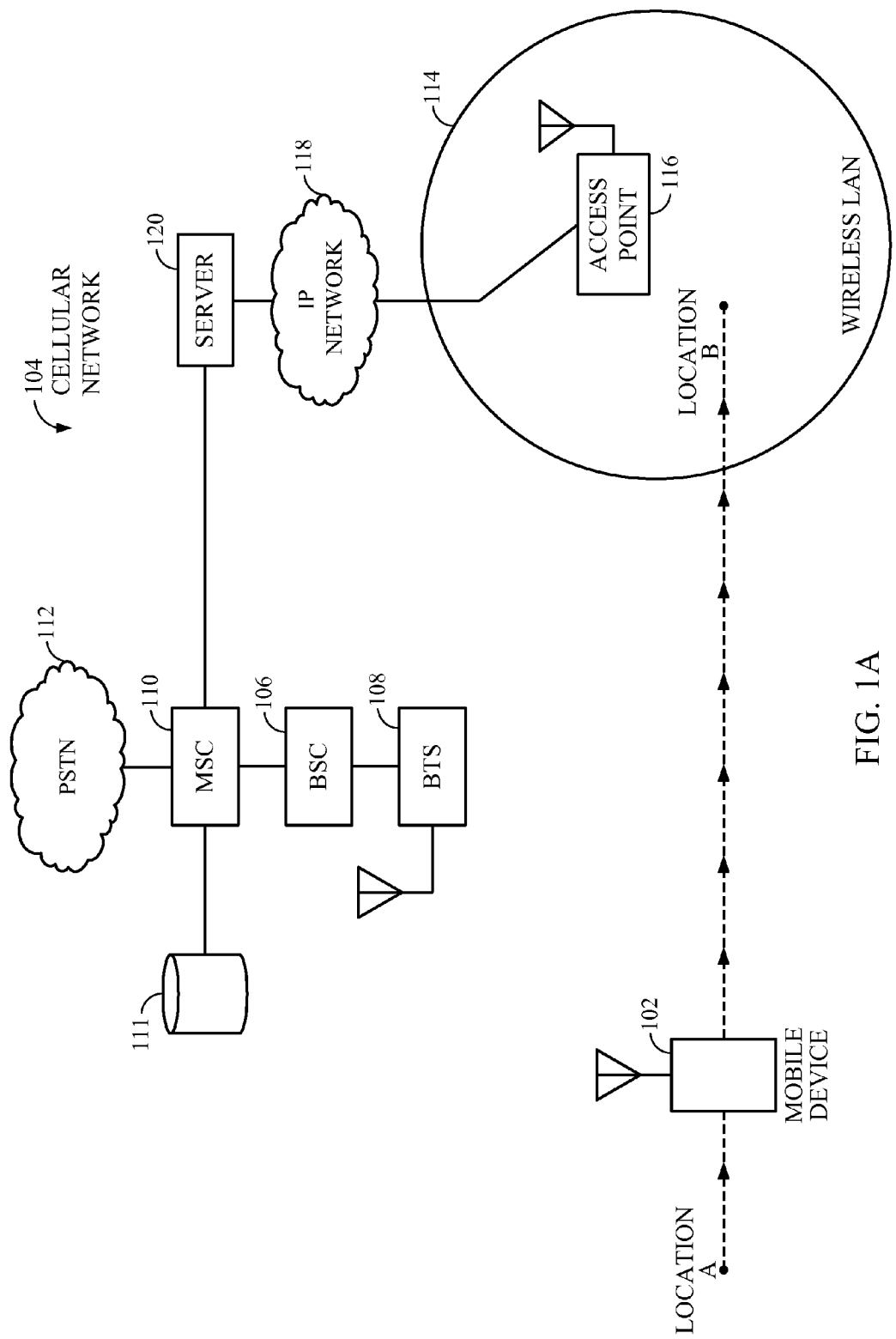
FIG. 1A is a conceptual block diagram of an aspect of a wireless communications system.

FIG. 1A is a conceptual block diagram of an aspect of a wireless communications system. A mobile device 102 is shown moving through a wide area cellular network 104 by a series of broken lines. The cellular network 104 includes a BSC 106 supporting a number of BTSs dispersed throughout the cellular coverage region. A single BTS 108 is shown in FIG. 1A for simplicity of explanation. A mobile switching center (MSC) 110 may be used to provide a gateway to a public switched telephone network (PSTN) 112 and may be coupled to a database 111. Although not shown in FIG. 1A, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

One or more wireless LANs may be dispersed throughout the cellular coverage region of the cellular network 104. A single wireless LAN 114 is shown in FIG. 1A as an example of any of a variety of packet-switched networks that may communicate with the mobile device 102. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112. The server 120, also known as the interworking function, may be one or more separate systems providing various functions as described in more detail in FIG. 2. Additionally, FIG. 1A does not illustrate all the possible communication pathways between the different systems and networks.

When power is initially applied to the mobile device 102, it will attempt to access either the cellular network 104 or the wireless LAN 114. The decision to access a particular network may depend on a variety of factors relating to the specific application and overall design constraints. By way of example, the mobile device 102 may be configured to access the wireless LAN 114 when the service quality meets a minimum threshold. To the extent the wireless LAN 114 can be used to support mobile telephony and data communications, valuable cellular bandwidth may be freed up for other mobile users.

The mobile device 102 may be configured to continuously search for a beacon from the access point 116, or any other access point of a wireless LAN. The beacon is a periodic signal transmitted by the access point 116 with synchronization information. In the event that the mobile device 102 cannot detect a beacon, which might be the case if power is applied to the mobile device 102 at location A, then the mobile device 102 attempts to access the cellular network 104. The mobile device 102 may access the cellular network 104 by acquiring a pilot signal from the BTS 108. Once the pilot signal is acquired, a radio connection may be established between the mobile device 102 and the BTS 108 by means well known in the art. The mobile device 102 may use the radio connection with the BTS 108 to register with the MSC 110. Registration is the process by which the mobile device 102 makes its whereabouts known to the cellular network 104. When the registration process is complete, the mobile device 102 may enter into an idle state until a call is initiated, either by the mobile device 102 or the PSTN 112. Either way, an air traffic link may be established between the mobile device 102 and the BTS 108 to set up and support the call.

When the mobile device 102 moves through the cellular network 104 from location A to location B in the depicted aspect, it is now able to detect a beacon from the access point 116. Once this occurs, a radio connection may be established between the two by means well known in the art. The mobile device 102 then determines the IP address of the interworking function 120. The mobile device 102 may use the services of a Domain Name Server (DNS) to determine the server's IP address. The domain name of the interworking function 120 may be either provisioned in the mobile device, or delivered to the mobile device when mobile device performs registration with either IMS domain or CS domain. Alternatively, the IP address of the server can also be hardcoded on the mobile device. With the IP address of the server known to the mobile device, the mobile device 102 can establish a network connection with the interworking function 120.

Figure 1B:
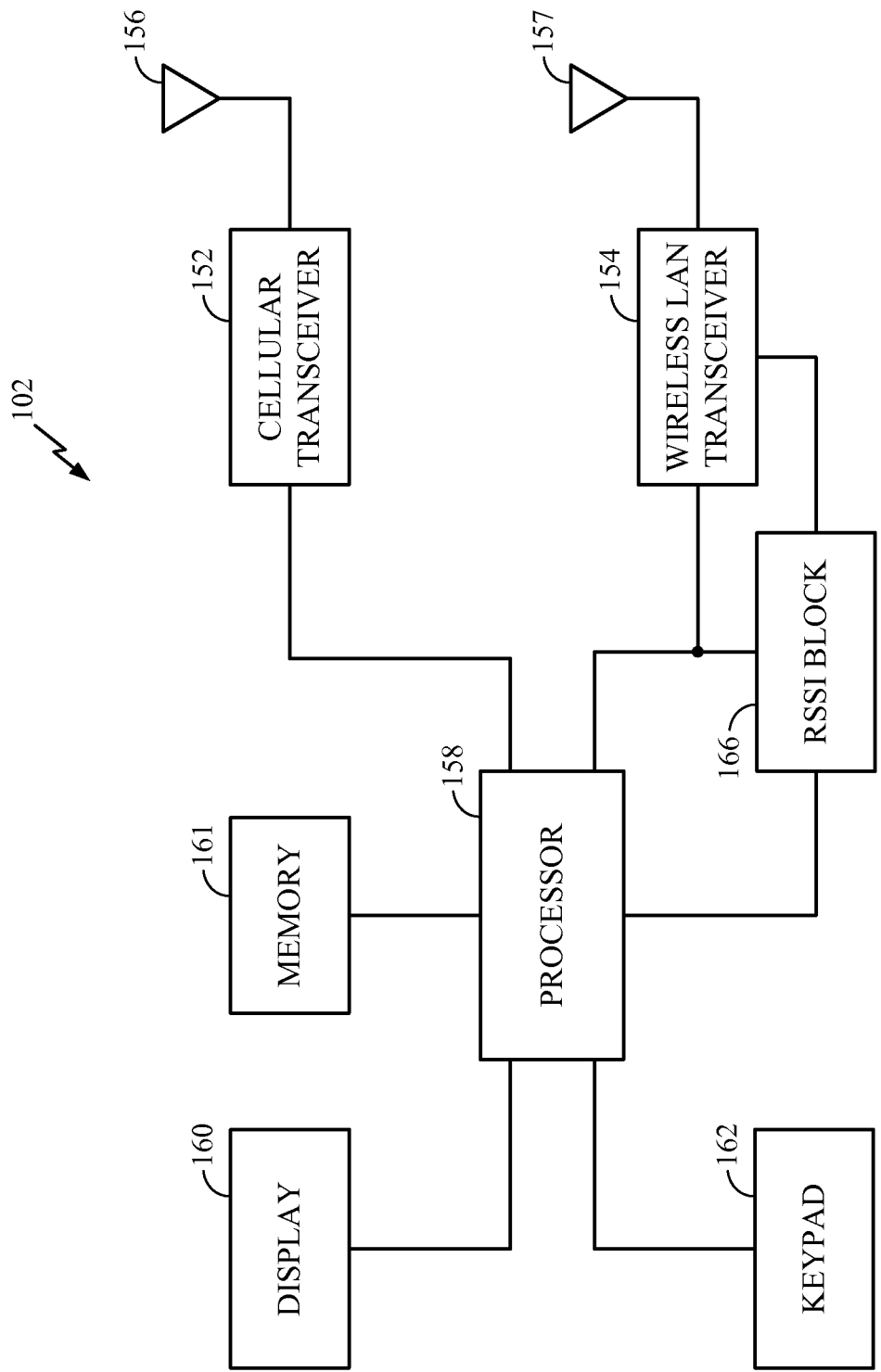
FIG. 1B is a functional block diagram illustrating an example of a mobile device capable of supporting both circuit switched cellular and wireless LAN communications.

FIG. 1B is a functional block diagram illustrating an example of a mobile device capable of supporting both circuit switched cellular and wireless LAN communications. The mobile device 102 may include a cellular transceiver 152 and a wireless LAN transceiver 154. In at least one aspect of the mobile device 102, the cellular transceiver 152 is capable of supporting CDMA2000 1x communications with a BTS (not shown), and the wireless LAN transceiver 154 is capable of supporting IEEE 802.11 communications with an access point (not shown). Those skilled in the art will readily appreciate, however, that the concepts described in connection with the mobile device 102 can be extended to other cellular and wireless LAN technologies. Each transceiver 152, 154 is shown with a separate antenna 156, 157, respectively, but the transceivers 152, 154 could share a single broadband antenna. Each antenna 156 and 157 may be implemented with one or more radiating elements.

The mobile device 102 is also shown with a processor 158 coupled to both transceivers 202, 204, however, a separate processor may be used for each transceiver in alternative aspects of the mobile device 102. The processor 158 may be implemented as hardware, firmware, software, or any combination thereof. By way of example, the processor 158 may include a microprocessor (not shown). The microprocessor may be used to support software applications that, among other things, (1) control and manage access to the cellular network and wireless LAN, and (2) interface the processor 158 to the keypad 162, display, 160, and other user interfaces (not shown). The processor 158 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The manner in which the processor 158 is implemented will depend on the particular application and the design constraints imposed on the overall system. Those skilled in the art will recognize the interchangeability of hardware, firmware, and software configurations under these circumstances, and how best to implement the described functionality for each particular application.

For certain purposes known in the art, the signal strength from the access point may be measured at the mobile device 102 with a received signal strength indicator (RSSI) block 166. The RSSI is most likely an existing signal that is fed back to the wireless LAN transceiver 154 for automatic gain control, and therefore, can be provided to the processor 158 without increasing the circuit complexity of the mobile device 102. Alternatively, the quality of the radio connection may be determined from the beacon.

The processor 158 may be configured to execute an algorithm to detect when handoff conditions exist and to initiate appropriate signaling with other connected systems. The algorithm may be implemented as one or more software applications supported by the microprocessor based architecture discussed earlier and stored in the accessible memory 161. Alternatively, the algorithm may be a module separate from the processor 158. The module may be implemented in hardware, software, firmware, or any combination thereof. Depending on the specific design constraints, the algorithm could be integrated into any entity in the mobile device 102, or distributed across multiple entities in the mobile device 102.

Figure 2:
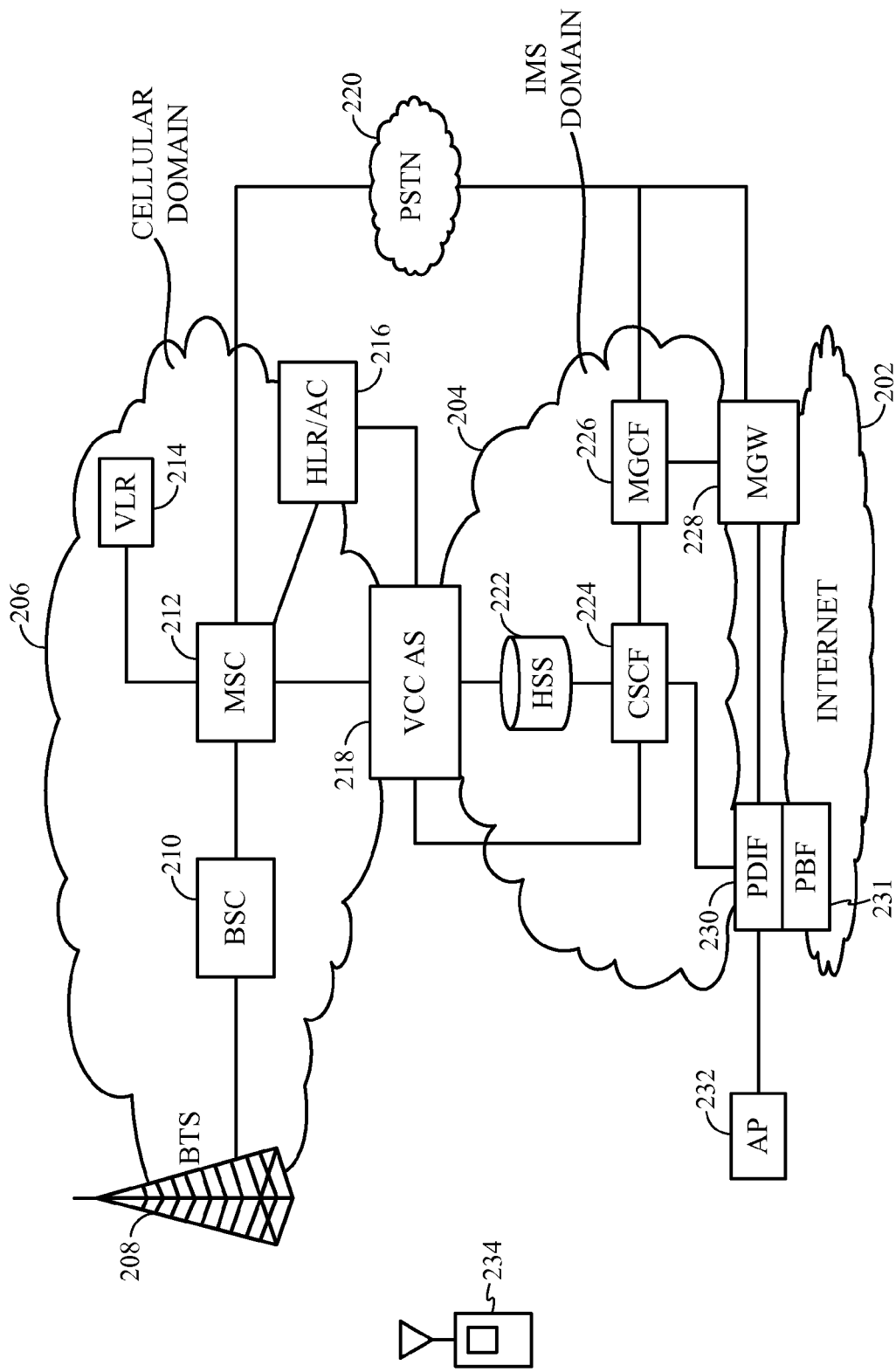
FIG. 2 depicts a more detailed conceptual block diagram of the gateway system of FIG. 1A.

To facilitate voice communications between a packet network and a circuit-switched network, such as the PSTN 112, the resources of the system 120 are utilized. Details of some functions or components of the system 120 are shown in more detail in FIG. 2. The system 120 of FIG. 1A is more comprehensively described as an IP Multimedia Subsystem (IMS) domain 204 as depicted in FIG. 2. The IMS domain has a number of different systems providing the following functions, for example: servers providing IP based services such as SIP servers and SIP registrars (known as Call Session Control Function, CSCF) 224, servers providing interworking with legacy PSTN networks such as MGCF 226 and MGW 228, servers providing interworking with CS cellular networks such as VCC AS 218. Also, a plurality of multimedia Application servers (not shown) can be included that provide different services to the mobile device 234 via the Internet 202. The specific servers identified in FIG. 2 are exemplary in nature and fewer or more servers can be included without departing from the scope of the present disclosure. In general, one function of the IMS domain 204 is that of mapping signaling and voice communications between the packet-switched network 206 and a circuit-switched network to thereby permit communications between the two. The IMS domain 204 may, for example, provide a SIP based network connection for a mobile device 234. The Session Initiation Protocol (SIP) is a signaling protocol used for establishing sessions in an IP network. A session could be a simple two-way telephone call or it could be a collaborative multi-media conference session. The ability to establish these sessions means that a host of innovative services become possible, such as voice-enriched e-commerce, web page click-to-dial, Instant Messaging with buddy lists, and IP Centrex services. Some other aspects illustrated by FIG. 2 is the inclusion of the HSS server 222 which is the home subscriber server and serves the same function as the HLR 216 in legacy circuit switched networks; and the connection between the PSTN 220 and the IMS domain 204. In the FIG. 2 also shown is a path between BSC (210) and Voice Call Continuity Application server (VCC AS) 218 through the MSC 212. On the wireless LAN side, the device 234 may use an access point 232 to reach a packet domain interface 230 within the IMS domain 204.

The other cellular network elements in FIG. 2 have been described previously such as the BTS 208, the BSC 210, the MSC 212, the VLR 214, the HLR/AC 216 and the PSTN 220. The mobile device 234 can access both the cellular network and a packet switched network, such as a wireless LAN, using the packet data interface 230 through the network access point 232.

In particular, the IMS domain may include a media gateway 228 that converts transmissions between a packet stream from the IP network and the voice circuit-switched network such as the PSTN 220. Thus, voice is carried in packets over the packet-switched network and the media gateway 228, while voice is carried over dedicated communication circuits in a circuit-switched connection between the media gateway 228 and the PSTN 220. A media gateway control function (MGCF) 226 is also provided that operates to terminate SIP signaling and control functions of the media gateway 228. In this regard, the MGCF 226 typically performs conversion between SIP signaling in the IP session and SS7 signaling in the circuit-switched session.

A voice call continuity application server (VCC AS) 218 is also provided that anchors certain communication sessions. The VCC AS is part of a service that a network operator may provide to its subscribers. This service may be automatically included as a service or be a subscription service which a user must select and possibly pay additional fees for its capabilities. Original designs of a multimode network such as that in FIG. 1A envisioned that each time a mobile device initiated a circuit-switched call, then (if they are a subscriber to the VCC service) that call session would be anchored at the VCC AS upon call initiation. Anchoring involves the VCC AS storing sufficient information to restore or handoff a session if it becomes necessary. Typically such information includes the identity of the two parties participating in the session, the services being utilized during the session, and any transport specific information that is useful in defining the state of the network and the call during the session.

The details of FIG. 2 are depicted as functional blocks and may be physically implemented in a variety of different ways. Each functional block may be one or more separate computer-based platforms for executing appropriate software or they may be logical functions of an application executing on the same computer-based platform. Also, the specific arrangement and inclusion of functional blocks in FIG. 2 is exemplary in nature and not all functional blocks are necessary in order to perform data and voice transmissions in accordance with the principles described herein. The page buffering function (PBF) 231 is depicted in FIG. 2 as connected to the Packet Data Interworking Function (PDIF) 230. This location is exemplary in nature and other arrangements for the PBF 231 are contemplated. For example, the PBF 231 may be co-located with the CSCF 224 although such a location would not embed PBF in a media path to the mobile device 234. Integrating or co-locating the PBF 231 with the PDIF 230 provides access to all communications directed to and from the device 234 through the AP 232. The PBF 231 is advantageously a system having an IP address such that the device 234 can access DNS to resolve the fully qualified domain name of the PBF to the IP address of the PBF. Knowing the IP address of the PBF, the mobile device can communicate with the PBF 231. The fully qualified domain name of the PBF can be either provisioned in the mobile device or delivered to mobile device at the registration. Alternatively, the mobile device can also be provisioned with the IP address of the PBF.

As explained in more detail below, the PBF 231 and the device 234 communicate after the mobile device 234 completes the registration with the AP 232. Messages are exchanged that relate to how long of a sleep interval the device 234 will perform and how the PBF will buffer data during this period.

As is well known in the art, the device 234 can approach an AP 232 to register with a packet-switched network such as WI-FI. During the negotiation process while registering, the device 234 can try to request different listen intervals which the AP 232 may support. Typically, the AP 232 supports only one listen interval and forces the device 234 to use this interval. The listen interval directly affects stand-by power usage because the device awakens from sleep mode at each listen interval to detect whether data is waiting for it at the AP 232. Thus, the longer the listen interval, the less power is used by the device 234 because it remains in sleep mode longer. However, a longer listen interval will require the AP 232 to buffer more data for the device 234. Moreover, as the number of mobile devices using the AP 232 increases, the support for larger listen interval requires more memory for packet storage at the AP. Therefore, an AP 232 typically does not support listen intervals outside the range of approximately hundreds of milliseconds.

When the device 234 awakens from sleep mode, it checks the beacon signal being periodically broadcast by the AP 232. Accordingly, if the AP 232 broadcasts the beacon signal every 100 ms, then the listen interval for the device 234 is typically set to be 100 ms. Included in the beacon signal is the traffic indicator map (TIM) that is a bitmap which informs a device 234 whether the AP 232 has data waiting for that device. If so, then the device 234 stays awake and engages in a session to retrieve the data. If not, then the device 234 returns to sleep for the duration of the listen interval before once again awakening and checking for waiting data.

Figure 3:
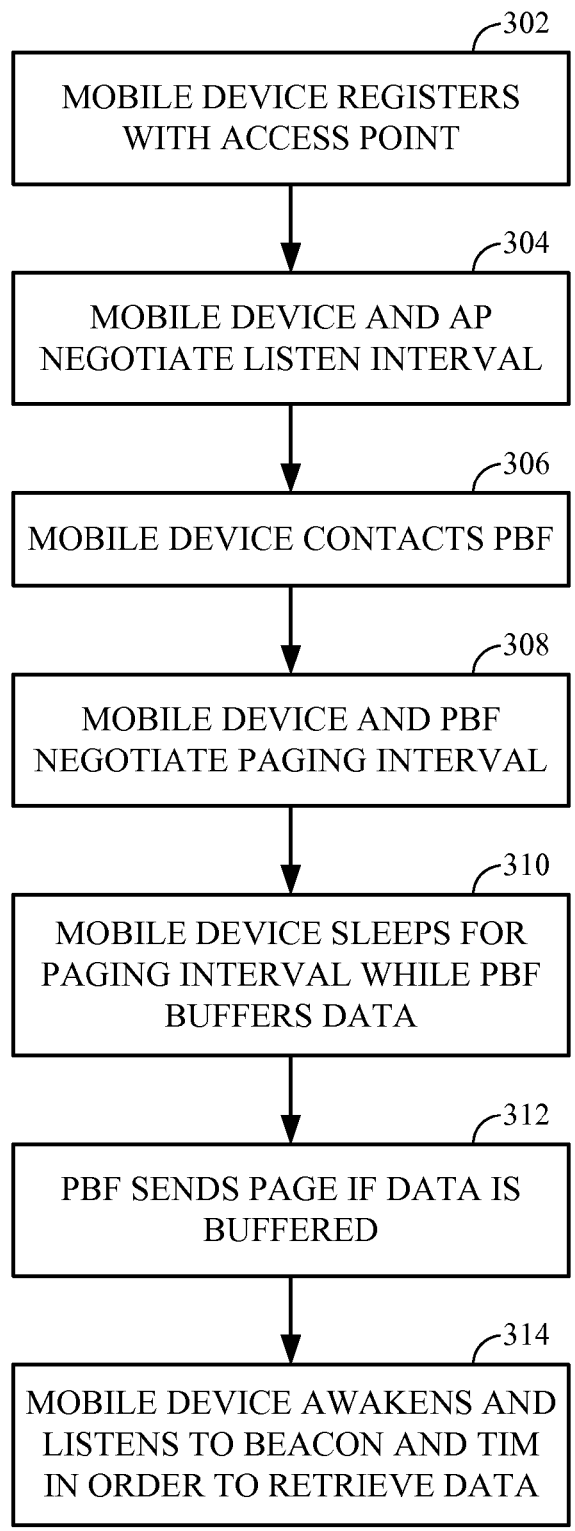
FIG. 3 depicts a flowchart of an exemplary method for buffering, scheduling, and delivering pages to the mobile device.

FIG. 3 depicts a flowchart of an exemplary method of providing a page buffering function in accordance with the principles of the present disclosure. In steps 302 and 304, the mobile device registers with the access point by associating with the access point. Part of this registration process involves the determining and assigning of a listen interval for the mobile device. Once registered, in step 306 the mobile device can then communicate with other functions such as the page buffering function (PBF) located upstream in the packet switched network. The mobile device can then register with the PBF and negotiates, in step 308, a paging interval. This paging interval is advantageously an integral multiple of the listen interval. For example, if the listen interval is 100 ms, then the paging interval may be 3 seconds. One of ordinary skill will recognize that paging intervals of approximately 1 second to 10 seconds will provide significant stand-by power improvements; however, other paging intervals are contemplated as well within the scope of the present disclosure.

In step 310, the mobile device sleeps for the duration of the paging interval. The access point is unaware of the paging interval negotiation between the PBF and the mobile device. Accordingly, the access point continues to broadcast its beacon signals at the regularly scheduled intervals even though the mobile device will not be awake to listen to them. While the mobile device is asleep during the paging interval, the PBF, in step 310, is buffering any data destined for the mobile device. One example may be a SIP invite to initiate a voice call or some other type of traffic session. By buffering the data for the mobile device, the PBF prevents the access point from attempting to deliver the data to the mobile device while the mobile device remains asleep. In absence of such buffering, the access point will attempt unsuccessfully to deliver the data to the sleeping mobile device resulting in data loss. On such repeated failures in data delivery, the access point may implicitly deregister the mobile device as well. To prevent these interruptions in data delivery, the mobile device and PBF coordinate and schedule the data delivery to the mobile device.

When the PBF determines that the paging interval has transpired, then it will send, in step 312, a page or the buffered data to the mobile device via the access point. If there is no buffered data, then there is no need to send the page.

In step 314, the mobile device awakens after the paging interval and listens to the access point beacon and TIM. If there has been a page received by the access point during the paging interval, then the TIM will reflect that the mobile device has data waiting for it. The mobile device should then signal to the PBF that it has changed from its stand-by (or sleep) state to the active (or traffic) state. In response, the PBF will transmit the buffered data and also stop buffering data such that subsequent data is passed through to the access point without buffering. When the mobile device once again enters its sleep mode for the duration of the paging interval, a message may be sent to the PBF so that it returns to the state of buffering data. One of ordinary skill will recognize that the PBF could implicitly enter and exit the "buffering" state by monitoring the traffic to and from the mobile device. However, the exchange of explicit message is less likely to introduce errors into the process. The PBF can send a separate "page signal" message that does not carry buffered data but simply acts as a message to the mobile device that data is waiting for the mobile device or the PBF can simply send the first buffered data packet to act as the page signal so that the access point sets the TIM in the beacon signal appropriately.

Figure 4:
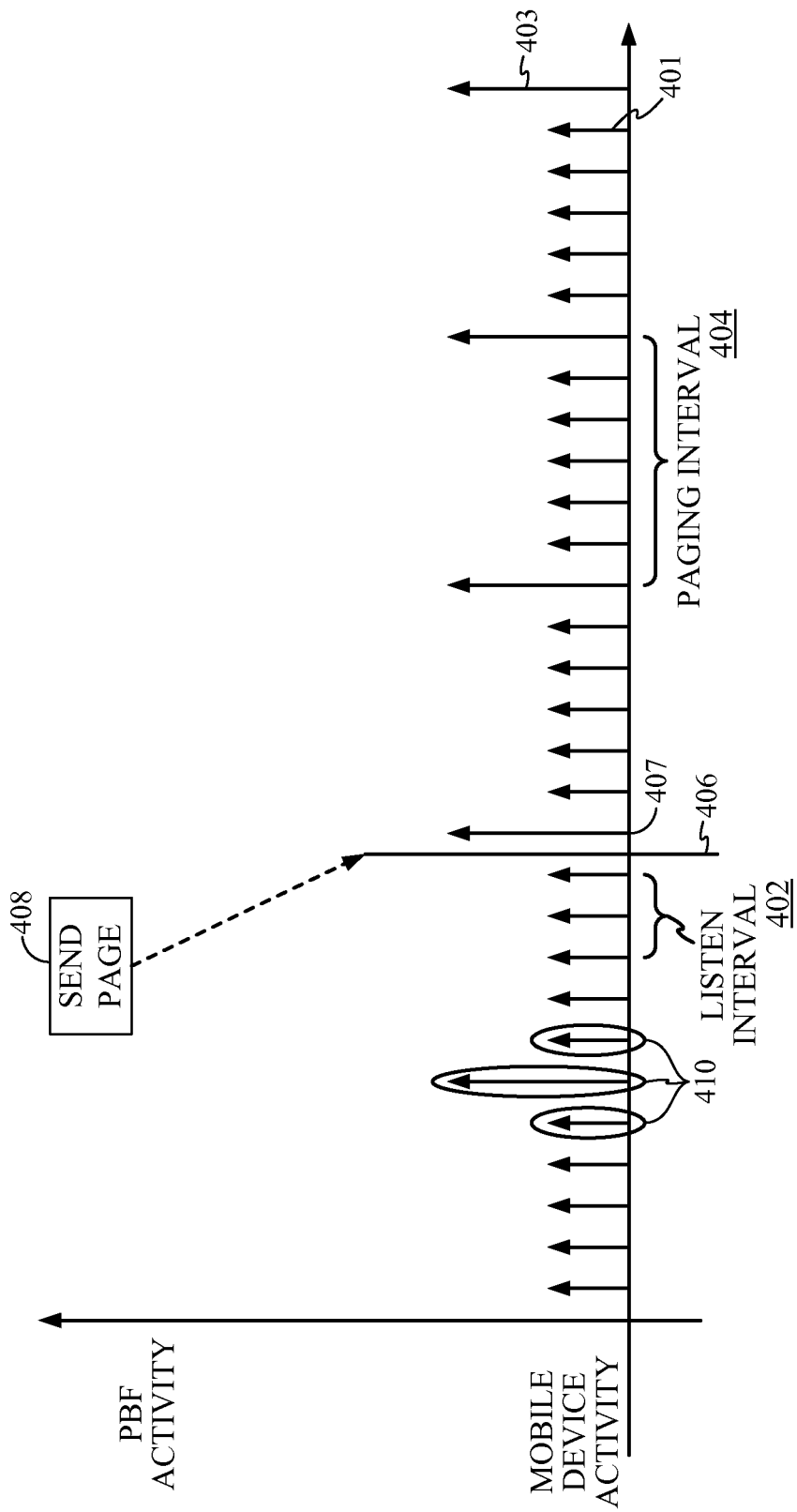
FIG. 4 depicts an example of listen interval and paging interval.

FIG. 4 depicts a timeline of various events of the mobile device and the PBF during data transmission and buffering. The small arrows 401 indicate the listen interval 402 which the mobile device would use to awaken if it had not negotiated a longer paging interval 404 with the PBF. The taller arrows 403 indicate the paging interval which is when the mobile device awakens to listen to the beacon signal from the access point. Each tall arrow 403 obscures a small arrow 401 that also concurrently occurs at that time as well. When there is data received by the PBF and buffered, then the PBF must send a page to the access point in such a manner that it will be included in the beacon signal (and TIM) that the mobile device will check once it awakens. The access point monitors whether a mobile device accesses data after it is informed via the TIM that data is waiting. If the mobile device does not retrieve the data, then the access point assumes the mobile device is not available and all data will be discarded. Thus, the PBF and the mobile device must coordinate and schedule the page or the data delivery such that the page or data transmitted by the PBF reaches the mobile device when the mobile device is awake and monitors the TIM. Following is the example of one such method to coordinate the page delivery to the mobile device. The mobile device includes the local time stamp in the registration request along with other information. On successful registration the PBF includes the PBF local time stamp in the registration response. The mobile device sends the registration confirmation to the PBF. After the exchange of these three messages the mobile device as well as the PBF can estimate the network delay. The mobile device and PBF can repeat the above procedure if necessary to improve the estimation. After this estimation, the PBF should advantageously send the page signal to the mobile device so that it arrives at the AP just before the beacon signal that corresponds to the paging interval expiration time. In FIG. 4, the send page signal 408 should arrive at time 406. In this way the TIM can be updated so that when the mobile device awakens at time 407 and listens to that beacon signal, it will become aware of waiting data.

Network delays and other transient events will introduce uncertainty into the calculation by the PBF of when is the opportune time to send the page signal 408. Thus, various approaches may be employed to improve the likelihood that data will be delivered without delay and without inefficient use of the network bandwidth. One exemplary method would involve having the mobile device awake for three beacon periods 410. This would include the beacon before the paging interval expiration, the paging interval beacon, and the beacon directly after the paging interval expiration. In this way, slight variations in delivery speed of the paging signal would be accommodated because the mobile device will be awake during at least three different TIM broadcasts.

Another method involves awakening the mobile device only for the signal beacon signal corresponding to the paging interval (e.g., 407). However, the PBF sends the page signal multiple times. In an exemplary technique, the PBF sends a first page signal to arrive approximately one beacon signal before the paging interval expiration, sends a second page signal to arrive just before the expiration of the paging interval, and send a third paging signal to arrive before the beacon signal immediately after the paging interval expiration. If the mobile device receives the data in duplication, the mobile device can easily discard the repeated data received from the PBF.

During the registration process between the PBF and the mobile device, a multiple message handshake protocol may be employed that includes timestamps. In this manner, the device and the PBF can try to estimate the delay (e.g., the channel, the queues, the processing) between the two entities. These estimated delays can then be used by the PBF to calculate when to send paging signals.

Following is the example of one such method to coordinate the page delivery to the mobile device. The mobile device includes the local time stamp in the registration request along with other relevant information. The PBF processes the registration request from the mobile device. On successful registration the PBF sends the registration reply to the mobile device. The PBF reply includes the time stamp provided by the mobile device in registration request as well as PBF local time stamp representing the time when reply was sent at PBF. Based on the mobile device time stamp contained in the registration reply and the time at which the registration reply is received at the mobile device, the mobile device can determine the wall clock round trip time to the PBF. The round trip time includes message processing time, message transmission time, and queuing delays. Under the assumption that the delay is identical in either direction, mobile device can estimate the one way delay as well as clock skew between its own clock and the PBF clock. The mobile device sends the registration confirmation to the PBF. The registration confirmation message also includes the time stamp provided by the PBF in the registration reply. Based on the PBF time stamp contained in the registration confirmation and the time at which the confirmation is received, the PBF determines the wall clock round trip time to the mobile device. Like the mobile device, the PBF determines the one way delay to the terminal as well as the possible clock skew between its own clock and the terminal clock. Based on the round trip delay and clock skew estimate, the PBF determines the page delivery schedule. After the exchange of these three messages the mobile device as well as the PBF can estimate the network delay. The mobile device and PBF can repeat the above procedure if necessary to improve the estimation. These estimated delays can then be used by the PBF to calculate when to send paging signals.

One additional feature that improves the robustness of the PBF functionality is the inclusion of a heartbeat signal. A periodic heartbeat between the mobile device and the PBF will ensure that the PBF can determine when to de-register the mobile device. If the heartbeat protocol is advantageously similar to the registration protocol in that it includes timestamp information, then the delay estimates can be repeatedly updated based on the information within the heartbeat signals. The mobile device stores the mapping of services and preferred access technology for each service. Reception of the page for the service on a non-preferred access technology while preferred access technology is available is an indication that network may have tried the page delivery on the preferred access and failed to deliver the page. Because a page was received on the non-preferred access network, but the preferred access page was not received, the terminal may determine that the failure of receiving a signal from the preferred access is due to incorrect page scheduling. One possible reason for such a failure could be the PBF protocol operation based on wrong estimate of parameters such as network delay. On such event, the terminal may perform the following:

restart the PBF registration procedure, which may include renegotiating the sleep interval. Re-estimating a network path delay between the mobile device and the server. On repeated such failures, the terminal may also disable the PBF operation altogether.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various illustrative logical blocks, modules, circuits, elements, and/or components described in connection with the aspects disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for selecting a sleep interval in a mobile communications device, comprising:
   negotiating a first sleep interval period with an access point;
   negotiating a second sleep interval period with one or more entities other than the access point, wherein the second sleep interval period is longer than the first sleep interval period, and wherein the second sleep interval is negotiated after registration with the access point is complete, and wherein at least one of the one or more entities other than the access point is configured to buffer data; and
   sending a signal to at least one of the one or more entities other than the access point indicating that buffering of data should cease.

2. The method of claim 1, wherein the second sleep interval period is an integral multiple of the first sleep interval period.

3. The method of claim 1, further comprising:
   sleeping through and ignoring beacon transmissions repeated at the first sleep interval and awakening from a stand-by mode upon expiration of the second sleep interval period.

4. The method of claim 1, further comprising:
   listening for a beacon signal upon expiration of the second sleep interval period; and
   determining if the beacon signal indicates data is available for the mobile communications device.

5. The method of claim 1, further comprising:
   periodically sending a heartbeat signal to at least one of the one or more entities other than the access point.

6. The method of claim 1, wherein the one or more entities other than the access point includes a page buffering function.

7. The method of claim 6, wherein the page buffering function is located upstream from the access point relative to the mobile communications device.

8. The method of claim 6, wherein the page buffering function is configured to buffer at least one of data or signaling destined for the mobile communications device.

9. The method of claim 1, further comprising:
   awakening from a stand-by mode upon expiration of the second sleep interval period;
   receiving buffered data from the at least one of the one or more entities other than the access point.

10. The method of claim 1, further comprising:
    awakening from a stand-by mode in time to listen to more than one beacon transmitted from the access point immediately preceding or immediately following the expiration of the second sleep interval period; and
    determining if one of the immediately preceding or immediately following beacon signal indicates data is available for the mobile communications device.

11. The method of claim 1, further comprising:
    estimating a network path delay between the mobile device and the server; and
    enabling buffering at the server.

12. The method of claim 11, further comprising:
    determining a failure in receiving a signal from a server due to incorrect scheduling of the signal; and
    performing at least one of the following:
      negotiating the second sleep interval period;
      re-estimating a network path delay between the mobile device and the server; or
      disabling the second sleep interval and buffering at the server.

13. The method of claim 1, further comprising:
    sending a signal to at least one of the one or more entities other than the access point, the signal indicating that the mobile communications device is ready to receive data, wherein the data is buffered at the at least one of the one or more entities other than the access point.

14. The method of claim 13, further comprising:
    receiving the buffered data.

15. A mobile communications device, comprising:
    a transceiver configured to listen for beacon signals from an access point; and
    a processor controlling the transceiver and configured to:
      negotiate a first sleep interval period with the access point,
      change the first sleep interval period to a second sleep interval period based on a negotiation with one or more entities other than the access point, wherein the second sleep interval period is longer than the first sleep interval period, and wherein the second sleep interval is negotiated after registration with the access point is complete, and wherein at least one of the one or more entities other than the access point is configured to buffer data, and
      send a signal to at least one of the one or more entities other than the access point indicating that buffering of data should cease.

16. The mobile communications device of claim 15, wherein the second sleep interval period is an integral multiple of the first sleep interval period.

17. The mobile communications device of claim 15, wherein the processor is further configured to awaken from a stand-by mode upon expiration of the second sleep interval period.

18. The mobile communications device of claim 15, wherein the processor is further configured to:
    listen for a beacon signal upon expiration of the second sleep interval period; and
    determine if the beacon signal indicates data is available for the mobile communications device.

19. The mobile communications device of claim 15, wherein the processor is further configured to send a heartbeat signal to at least one of the one or more entities other than the access point.

20. The mobile communications device of claim 15, wherein the one or more entities other than the access point includes a page buffering function.

21. The mobile communications device of claim 20, wherein the page buffering function is located upstream from the access point relative to the mobile communications device.

22. The mobile communications device of claim 20, wherein the page buffering function is configured to buffer at least one of data or signaling destined for the mobile communications device.

23. The mobile communications device of claim 15, wherein the processor is further configured to:
   awaken from a stand-by mode upon expiration of the second sleep interval period, and
   receive buffered data from the at least one of the one or more entities other than the access point.

24. The mobile communications device of claim 15, wherein the processor is further configured to:
   awaken the mobile communications device from a stand-by mode in time to listen to more than one beacon transmitted from the access point immediately preceding or immediately following the expiration of the second sleep interval period, and
   determine if one of the immediately preceding or immediately following beacon signal indicates data is available for the mobile communications device.

25. The mobile communications device of claim 15, wherein the processor is further configured to:
   estimate a network path delay between the mobile device and the server; and
   enable buffering at the server.

26. The mobile communications device of claim 25, wherein the processor is further configured to:
   determine a failure in receiving a signal from a server due to incorrect scheduling of the signal, and
   perform at least one of the following:
      negotiating the second sleep interval period;
      re-estimating a network path delay between the mobile device and the server; or
      disabling the second sleep interval and buffering at the server.

27. The mobile communications device of claim 15, wherein the access point is associated with a WI-FI.

28. A non-transitory computer-readable medium including instructions stored thereon, the stored instructions, when executed by a processor, cause the processor to perform a method comprising:
   negotiating a first sleep interval period with an access point;
   changing the first sleep interval period to a second sleep interval period based on a negotiation with one or more entities other than the access point, wherein the second sleep interval period is longer than the first sleep interval period, and wherein the second sleep interval is negotiated after registration with the access point is complete, and wherein at least one of the one or more entities other than the access point is configured to buffer data; and
   sending a signal to at least one of the one or more entities other than the access point indicating that buffering of data should cease.

29. A mobile communications device capable of communicating over multiple access networks, comprising:
   a transceiver configured to listen for beacon signals from an access point;
   means for negotiating a first sleep interval period with the access point;
   means for changing the first sleep interval period to a second sleep interval period based on a negotiation with one or more entities other than the access point, wherein the second sleep interval period is longer than the first sleep interval period, and wherein the second sleep interval is negotiated after registration with the access point is complete, and wherein at least one of the one or more entities other than the access point is configured to buffer data; and
   means for sending a signal to at least one of the one or more entities other than the access point indicating that buffering of data should cease.

30. A method for buffering data to be delivered to a mobile communications device, comprising:
   negotiating a sleep interval with the mobile communications device that is downstream from an access point, wherein the sleep interval is negotiated after registration with the access point is complete;
   buffering data destined for the mobile communications device at a server;
   receiving a signal from the mobile communications device, the signal indicating that buffering of data should cease; and
   transmitting at least a portion of the buffered data to the mobile communications device.

31. The method of claim 30, wherein the at least a portion of the buffered data is transmitted to the mobile communications device upon expiration of the sleep interval.

32. The method of claim 30, wherein the at least a portion of the buffered data is transmitted to the mobile communications device upon receiving a signal from the mobile communications device.

33. The method of claim 30, further comprising:
   transmitting the at least a portion of the buffered data during a predetermined time period before the expiration of the sleep interval.

34. The method of claim 33, wherein the predetermined time period is estimated between the server and the mobile communications device by exchanging at least a message between the mobile communications device and the server.

35. The method of claim 30, further comprising:
   transmitting the at least a portion of the buffered data multiple times so that at least one of these transmissions reaches the mobile communications device when the mobile communications device is awake.

36. A server, comprising:
   a memory;
   a processor, coupled with the memory, configured to:
      negotiate a sleep interval with a mobile communications device that is downstream from an access point, both of which are downstream from the server, wherein the sleep interval is negotiated after registration with the access point is complete;
      estimate a network path delay between the server and the mobile communications device;
      buffer data destined for the mobile communications device;
      receive a signal from the mobile communications device, the signal indicating that buffering of data should cease; and
      transmit at least a portion of the buffered data to the mobile communications device.

37. The server of claim 36, wherein the at least a portion of the buffered data is transmitted to the mobile communications device upon expiration of the sleep interval.

38. The server of claim 36, wherein the at least a portion of the buffered data is transmitted to the mobile communications device upon receiving a signal from the mobile communications device.

39. The server of claim 36, wherein the processor is further configured to exchange a heartbeat signal with the mobile communications device.

40. The server of claim 36, wherein the processor is further configured to transmit the at least a portion of the buffered data during a predetermined time period before the expiration of the sleep interval.

41. The server of claim 40, wherein the predetermined time period is approximately an estimated expected network delay to deliver a signal from the server to the mobile communications device.

42. The server of claim 36, wherein the processor is further configured to transmit the at least a portion of the buffered data multiple times so that at least one of these transmissions reaches the mobile communications device when the mobile communications device is awake.

43. A non-transitory computer-readable medium including instructions stored thereon, the stored instructions, when executed by a processor, cause the processor to perform a method comprising:
- negotiating a sleep interval with a mobile communications device that is downstream from an access point, both of which are downstream from a server, wherein the sleep interval is negotiated after registration with the access point is complete;
- buffering data destined for the mobile communications device at the server;
- receiving a signal from the mobile communications device, the signal indicating that buffering of data should cease; and
- transmitting at least a portion of the buffered data to the mobile communications device.

44. The non-transitory computer-readable medium of claim 43, wherein the at least a portion of the buffered data is transmitted to the mobile communications device upon expiration of the sleep interval.

45. The non-transitory computer-readable medium of claim 43, wherein the at least a portion of the buffered data is transmitted to the mobile communications device upon receiving a signal from the mobile communications device.

46. The non-transitory computer-readable medium of claim 43, wherein the method further comprising:
- transmitting the at least a portion of the buffered data during a predetermined time period before the expiration of the sleep interval.

47. The non-transitory computer-readable medium of claim 46, wherein the predetermined time period is estimated between the server and the mobile communications device by exchanging at least a message between the mobile communications device and the server.

48. The non-transitory computer-readable medium of claim 43, wherein the method further comprising:
- transmitting the at least a portion of the buffered data multiple times so that at least one of these transmissions reaches the mobile communications device when the mobile communications device is awake.

49. An apparatus operable in a wireless communications system, comprising:
- means for negotiating a sleep interval with a mobile communications device that is downstream from an access point, both of which are downstream from the apparatus, wherein the sleep interval is negotiated after registration with the access point is complete;
- means for buffering data destined for the mobile communications device at the apparatus;
- means for receiving a signal from the mobile communications device, the signal indicating that buffering of data should cease; and
- means for transmitting at least a portion of the buffered data to the mobile communications device.

50. The apparatus of claim 49, wherein the at least a portion of the buffered data is transmitted to the mobile communications device upon expiration of the sleep interval.

51. The apparatus of claim 49, wherein the at least a portion of the buffered data is transmitted to the mobile communications device upon receiving a signal from the mobile communications device.

52. The apparatus of claim 49, further comprising:
- means for transmitting the at least a portion of the buffered data during a predetermined time period before the expiration of the sleep interval.

53. The apparatus of claim 52, wherein the predetermined time period is estimated between the apparatus and the mobile communications device by exchanging at least a message between the mobile communications device and the apparatus.

54. The apparatus of claim 49, further comprising:
- means for transmitting the at least a portion of the buffered data multiple times so that at least one of these transmissions reaches the mobile communications device when the mobile communications device is awake.

* * * * *